No. 640,942. Patented Jan. 9, 1900.
G. J. PEACOCK.
ELEVATOR TRUCK.
(Application filed Aug. 16, 1899.)
(No Model.)

WITNESSES:
H. E. Harrison
H. J. Levis

INVENTOR
George J. Peacock
BY
C. D. Levis
ATTORNEY.

THE NORRIS PETERS CO., PHOTO-LITHO., WASHINGTON, D. C.

United States Patent Office.

GEORGE J. PEACOCK, OF PITTSBURG, PENNSYLVANIA, ASSIGNOR OF THREE-EIGHTHS TO H. V. POTTER, OF SAME PLACE.

ELEVATOR-TRUCK.

SPECIFICATION forming part of Letters Patent No. 640,942, dated January 9, 1900.

Application filed August 16, 1899. Serial No. 727,399. (No model.)

*To all whom it may concern:*

Be it known that I, GEORGE J. PEACOCK, a citizen of the United States of America, residing at Pittsburg, in the county of Allegheny and State of Pennsylvania, have invented certain new and useful Improvements in Elevator-Trucks; and I do hereby declare the following to be a full, clear, and exact description thereof, reference being had to the accompanying drawings, which form a part of this specification.

My invention relates to an improved elevator-truck for use in warehouses, stores, &c.; and it consists in a truck mounted upon small wheels having a platform capable of being elevated or lowered to any desired position, together with certain details of construction and combination of parts, as will be fully described hereinafter.

The object of my present invention is to provide a truck the platform of which may be lowered to a short distance above the floor in order that the same may be easily loaded with heavy articles—such as barrels, stoves, pianos, &c.—then moved to wagons, and the platform, together with its load, elevated to the level of the bed of the wagon by power-cranks, thereby rendering the moveing and loading of such heavy articles an easy task.

Figure 1:
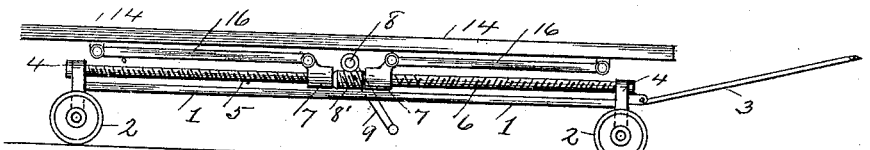
Figure 2:
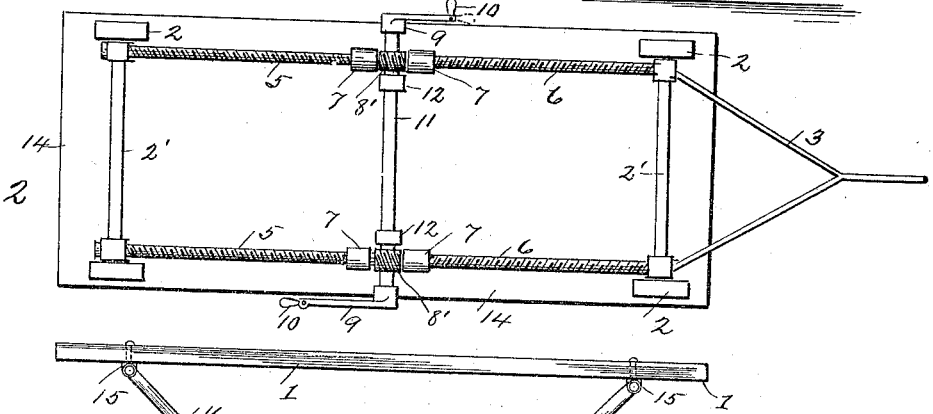
Figure 3:
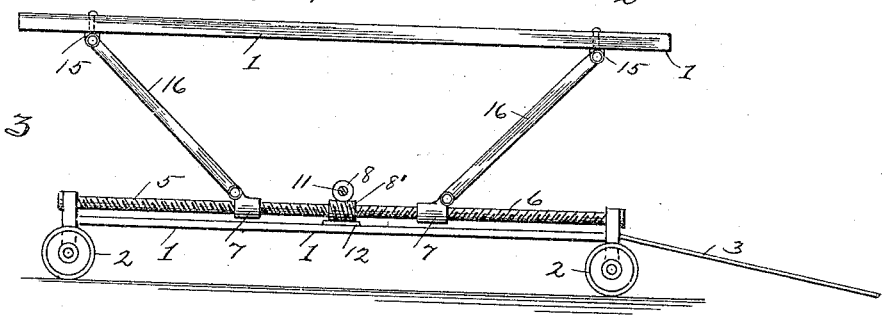
Figure 4:
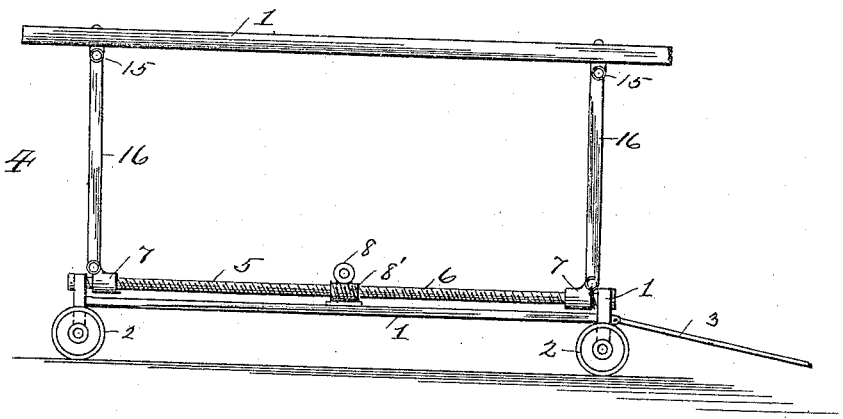

In the drawings, Figure 1 is a side elevation of my improved truck constructed and arranged in accordance with my invention, the same being shown with the platform lowered to receive its load. Fig. 2 is an inverted plan view of the same. Fig. 3 is a side elevation of the truck, showing the platform partially elevated. Fig. 4 is a side view of the truck, having the platform elevated to its extreme height.

To construct an elevator-truck in accordance with my invention, I provide a frame L of a suitable size and form of construction and mount the same upon small wheels 2 and axles 2' in a manner well known in the art. Arranged in suitable bearings 4 upon this frame L are two shafts provided with right (5) and left (6) threads and also with worms 8'. These worms 8' are located at the center of each of the thread-shafts 5 6 and are in mesh with worm-wheels 8. A transverse shaft 11 is arranged in bearings 12, attached to the frame L, and the said shaft 11 is fitted at each end with power-cranks 9. The hand-pieces 10 of these cranks are hinged to permit the same to fold in line with the crank-bar 9 to prevent interfering with objects while the truck is in motion. Operating upon each of the right and left threads of the shafts 5 6 are threaded bearings 7, to which are hinged supporting-bars 16, the other extremities of which are journaled to bearings 15, attached to the under side of the platform 14 of the truck.

In operation the cranks 9 are revolved, which transmits motion by means of the shaft 11 to the two worm-wheels 8, rotating the worms 8' and shafts 5 6. The bearings 7, being prevented from turning, will move along the said shafts in opposite directions either to elevate or lower the platform 14, as is obvious. The platform 14 will stand rigid in any position above the frame L, as the weight upon the truck will have no effect upon altering the position of the bearings 7.

The advantages of a truck constructed as described are many and obvious. One man can place a heavy article upon the truck when lowered to a position such as shown at Fig. 1 and elevate the platform, as shown at Figs. 3 and 4, to load the same into a wagon.

Having thus described my invention, I claim—

1. An elevator-truck, comprising the frame L, mounted upon wheels 2, the right and left thread shafts 5 6 mounted in bearings upon the said frame, the worms 8' and wheels 8 for revolving the said shafts, the threaded bearings 7, and the supporting-bars 16 hinged to the platform 14, and said bearings, all arranged and combined for service substantially as described.

2. An elevator-truck consisting of the frame mounted upon wheels, the threaded shafts 5 6, the bearings 7, operating upon the said shafts, the supporting-bars 16 attached to the said bearings and to the under side of the platform, and a means whereby the shafts 5 6 may be given a rotatable movement in either direction, as described.

In testimony whereof I have hereunto affixed my signature in the presence of two subscribing witnesses.

GEORGE J. PEACOCK.

Witnesses:
 JAS. J. MCAFEE,
 H. J. LEVIS.